(12) United States Patent
Oh

(10) Patent No.: US 10,939,496 B2
(45) Date of Patent: Mar. 2, 2021

(54) METHOD AND APPARATUS FOR MITIGATING INTERFERENCE EFFECTS USING ANTENNA DISCRIMINATION ANGLE

(71) Applicant: ELECTRONICS AND TELECOMMUNICATIONS RESEARCH INSTITUTE, Daejeon (KR)

(72) Inventor: Dae Sub Oh, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 83 days.

(21) Appl. No.: 16/546,093

(22) Filed: Aug. 20, 2019

(65) Prior Publication Data

US 2020/0178347 A1 Jun. 4, 2020

(30) Foreign Application Priority Data

Dec. 4, 2018 (KR) .................. 10-2018-0154174

(51) Int. Cl.
*H04W 84/06* (2009.01)
*H04W 72/08* (2009.01)
*H04B 7/185* (2006.01)

(52) U.S. Cl.
CPC ........ *H04W 84/06* (2013.01); *H04B 7/18513* (2013.01); *H04B 7/18539* (2013.01); *H04W 72/082* (2013.01)

(58) Field of Classification Search
CPC .............. H04W 84/06; H04W 72/082; H04B 7/18539; H04B 7/18513
See application file for complete search history.

(56) References Cited

U.S. PATENT DOCUMENTS

| | | | | |
|---|---|---|---|---|
| 2001/0045494 A1* | 11/2001 | Higgins | ............ | H04B 7/18513 244/158.4 |
| 2002/0058478 A1* | 5/2002 | de La Chapelle | .. | H04W 52/283 455/13.4 |
| 2004/0110467 A1* | 6/2004 | Wang | ..................... | H04B 7/195 455/12.1 |
| 2004/0152420 A1* | 8/2004 | Redi | ..................... | H04W 52/10 455/67.11 |

(Continued)

FOREIGN PATENT DOCUMENTS

KR 20120048942 A 5/2012

*Primary Examiner* — Ankur Jain

(57) ABSTRACT

An interference effect mitigating method may be a method of mitigating interference effects of a mobile earth station to a terrestrial radio station. The interference effect mitigating method may include collecting position information including a position, of a communication device of a first wireless communication network, which changes over time, determining an antenna discrimination angle based on the collected position information, and determining a transmission power and a transmission scheme of the communication device of the first wireless communication network based on the determined antenna discrimination angle, to mitigate interference effects of the communication device of the first wireless communication network to a communication device of a second wireless communication network.

19 Claims, 5 Drawing Sheets

(56) References Cited

U.S. PATENT DOCUMENTS

| | | | |
|---|---|---|---|
| 2009/0042509 A1* | 2/2009 | Karabinis | H04B 7/18513 455/12.1 |
| 2015/0063201 A1* | 3/2015 | Kim | H04B 7/18513 370/316 |
| 2015/0188644 A1* | 7/2015 | Kang | H04B 7/2041 455/12.1 |
| 2016/0241328 A1* | 8/2016 | Kang | H04W 52/146 |

* cited by examiner

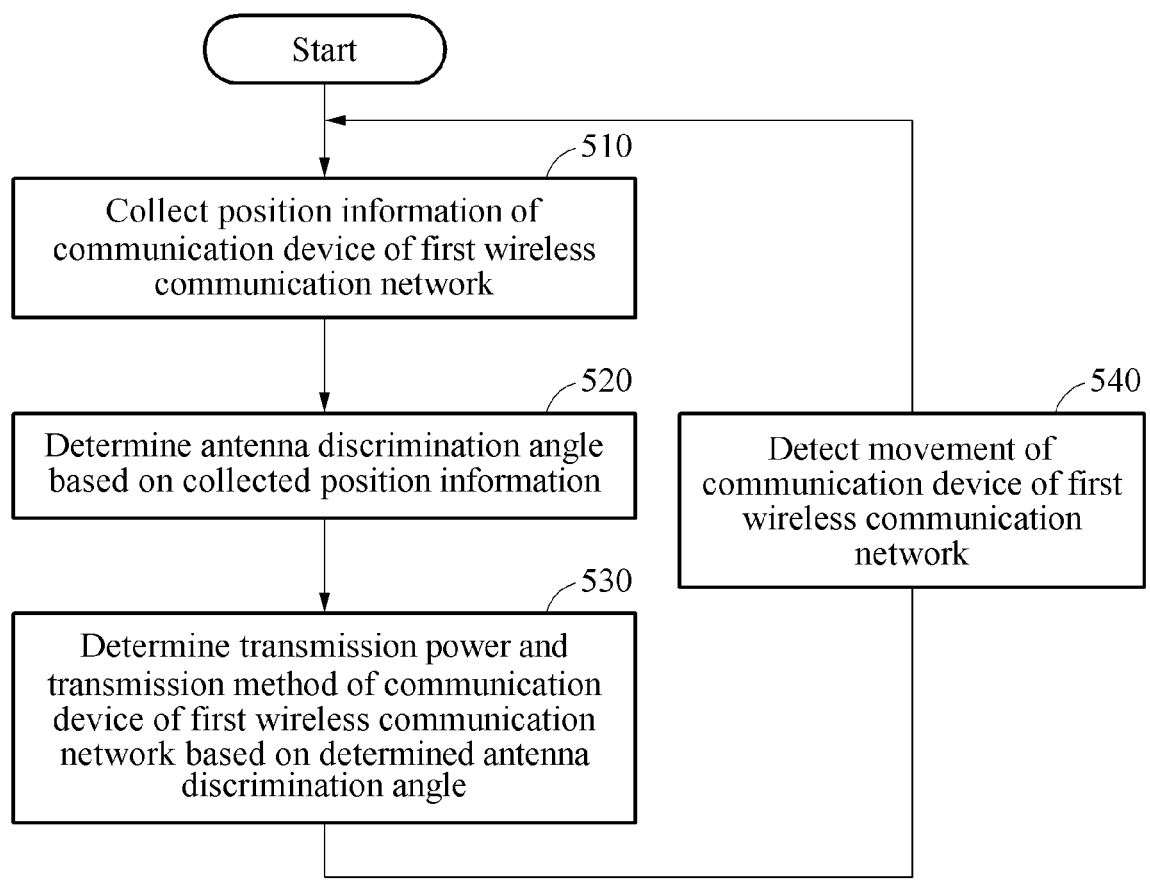

METHOD AND APPARATUS FOR MITIGATING INTERFERENCE EFFECTS USING ANTENNA DISCRIMINATION ANGLE

CROSS-REFERENCE TO RELATED APPLICATION(S)

This application claims the benefit of Korean Patent Application No. 10-2018-0154174, filed on Dec. 4, 2018, in the Korean Intellectual Property Office, the disclosure of which is incorporated herein by reference.

BACKGROUND

1. Field of the Invention

One or more example embodiments relate to a method and apparatus for mitigating interference effects using an antenna discrimination angle of a mobile earth station with respect to a horizontal direction.

2. Description of the Related Art

A satellite communication system includes a space station, for example, a satellite, positioned in an outer space and a ground or earth station. The satellite communication system is a type of wireless communication system using radio waves and uses a predetermined frequency band.

Due to the explosive growth of wireless communication systems, different wireless communication systems operate in a single frequency band in many cases. In particular, in a situation in which a terrestrial communication system concurrently uses the frequency band used by the satellite communication system, that is, when different wireless communication systems use the same frequency band, radio frequency interference and interference effects cause a performance deterioration, which becomes a significant issue.

To solve an interference issue between the satellite communication system and the terrestrial communication system using the same frequency band, a method of distinguishing frequency channels such that the two communication systems use different frequency bands, or a method of decreasing an interference signal below an acceptable interference level of a victim receiver by a sufficiently large distance between a transmitting interferer and the victim receiver is used.

However, a frequency resource efficiency may be degraded when frequency channels are divided for use, and a service range may decrease when the distance, a separation distance, between the transmitting interferer and the victim receiver is sufficiently great, for example, tens of kilometers or more. Accordingly, there is a need for a method of mitigating interference effects of a mobile earth station with respect to terrestrial radio stations SUMMARY An aspect provides an interference effect mitigating apparatus which may adjust a transmission power of a mobile earth station to mitigate interference effects to a terrestrial radio station, using an antenna discrimination angle of the mobile earth station with respect to a horizontal direction, area of victim stations or victim station.

The antenna discrimination angle defines the angle between link of space station-mobile earth station and horizontal direction including area of victim stations or victim station at the mobile earth station.

An aspect provides an interference effect mitigating apparatus which may mitigate interference effects to a terrestrial radio station, using an antenna discrimination angle of a antenna pointing direction of mobile earth station with respect to a horizontal direction, irrespective of position information of the terrestrial radio station which is a victim receiver in case that there is no position information of terrestrial radio station.

An aspect provides an interference effect mitigating method which may mitigate interference effects to a terrestrial radio station using an antenna discrimination angle which is the angle between a satellite station and the terrestrial radio station at the mobile earth station when an interference effect mitigating apparatus knows position information of the terrestrial radio station which is a victim receiver.

According to an aspect, there is provided a method of mitigating interference effects, the method including collecting position information including a position, of a communication device of a first wireless communication network, which changes over time, determining an antenna discrimination angle based on the collected position information, and determining a transmission power and a transmission scheme of the communication device of the first wireless communication network based on the determined antenna discrimination angle, to mitigate interference effects of the communication device of the first wireless communication network to a communication device of a second wireless communication network.

The interference effects of the communication device of the first wireless communication network to the communication device of the second wireless communication network may decrease when the antenna discrimination angle increases, or the interference effects of the communication device of the first wireless communication network to the communication device of the second wireless communication network may increase when the antenna discrimination angle decreases.

The communication device of the first wireless communication network may be a mobile earth station which communicates with a geosynchronous satellite, and the communication device of the second wireless communication network may be a terrestrial radio station which performs wireless communication.

The antenna discrimination angle may be determined based on a position of the geosynchronous satellite and a position of the mobile earth station.

i) When the antenna discrimination angle is greater than or equal to 0 degrees and less than $\alpha$ degrees, the transmission power may be level 1, and the transmission scheme may be Binary Phase Shift Keying (BPSK), or ii) when the antenna discrimination angle is greater than or equal to $\alpha$ degrees and less than $\beta$ degrees, the transmission power may be level 2, and the transmission scheme may be Quadrature Phase Shift Keying (QPSK), or iii) when the antenna discrimination angle is greater than or equal to $\beta$ degrees and less than $\gamma$ degrees, the transmission power may be level 3, and the transmission scheme may be Eight Phase Shift Keying (8PSK), or iv) when the antenna discrimination angle is greater than or equal to $\gamma$ degrees and less than 90 degrees, the transmission power may be level 4, and the transmission scheme may be 16 Quadrature Amplitude Modulation (16QAM).

The transmission power of the communication device of the first wireless communication network may increase when the antenna discrimination angle increases, or the transmission power of the communication device of the first wireless communication network may decrease when the antenna discrimination angle decreases.

The transmission scheme may be determined to compensate for a change in the transmission power of the communication device of the first wireless communication network.

The communication device of the first wireless communication network and the communication device of the second wireless communication network may use the same frequency band or adjacent frequency bands.

The determining of the transmission power of the communication device of the first wireless communication network may include updating the transmission power of the communication device of the first wireless communication network over time, based on the antenna discrimination angle corresponding to the position, of the communication device of the first wireless communication network, which changes over time.

According to an aspect, there is provided an apparatus for mitigating interference effects, the apparatus including a processor and a memory including computer-readable instructions, wherein, when the instructions are executed by the processor, the processor may be configured to collect position information including a position, of a communication device of a first wireless communication network, which changes over time, determine an antenna discrimination angle based on the collected position information, and determine a transmission power and a transmission scheme of the communication device of the first wireless communication network based on the determined antenna discrimination angle, to mitigate interference effects of the communication device of the first wireless communication network to a communication device of a second wireless communication network.

The interference effects of the communication device of the first wireless communication network to the communication device of the second wireless communication network may decrease when the antenna discrimination angle increases, or the interference effects of the communication device of the first wireless communication network to the communication device of the second wireless communication network may increase when the antenna discrimination angle decreases.

The communication device of the first wireless communication network may be a mobile earth station which communicates with a geosynchronous satellite, and the communication device of the second wireless communication network may be a terrestrial radio station which performs wireless communication.

The antenna discrimination angle may be determined based on a position of the geosynchronous satellite and a position of the mobile earth station.

i) When the antenna discrimination angle is greater than or equal to 0 degrees and less than α degrees, the transmission power may be level 1, and the transmission scheme may be BPSK, or ii) when the antenna discrimination angle is greater than or equal to α degrees and less than β degrees, the transmission power may be level 2, and the transmission scheme may be QPSK, or iii) when the antenna discrimination angle is greater than or equal to β degrees and less than γ degrees, the transmission power may be level 3, and the transmission scheme may be 8PSK, or iv) when the antenna discrimination angle is greater than or equal to γ degrees and less than 90 degrees, the transmission power may be level 4, and the transmission scheme may be 16QAM.

The transmission power of the communication device of the first wireless communication network may increase when the antenna discrimination angle increases, or the transmission power of the communication device of the first wireless communication network may decrease when the antenna discrimination angle decreases.

The processor may be configured to determine the transmission scheme to compensate for a change in the transmission power of the communication device of the first wireless communication network.

The communication device of the first wireless communication network and the communication device of the second wireless communication network may use the same frequency band or adjacent frequency bands.

The processor may be configured to update the transmission power of the communication device of the first wireless communication network over time, based on the antenna discrimination angle corresponding to the position, of the communication device of the first wireless communication network, which changes over time, when determining the transmission power of the communication device of the first wireless communication network.

According to example embodiments, an interference effect mitigating apparatus may adjust a transmission power of a mobile earth station to mitigate interference effects to a terrestrial radio station, using an antenna discrimination angle of the mobile earth station with respect to a horizontal direction.

According to example embodiments, an interference effect mitigating apparatus may mitigate interference effects to a terrestrial radio station, using an antenna discrimination angle of a mobile earth station with respect to a horizontal direction, irrespective of position information of the terrestrial radio station which is a victim receiver.

According to example embodiments, an interference effect mitigating method may mitigate interference effects to a terrestrial radio station using an antenna discrimination angle between a satellite system and the terrestrial radio station, that is, a space station-mobile earth station antenna discrimination angle, when an interference effect mitigating apparatus knows position information of the terrestrial radio station which is a victim receiver.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which:

FIG. 5 illustrates an interference effect mitigating method performed by an interference effect mitigating apparatus according to an example embodiment.

DETAILED DESCRIPTION

Figure 1:
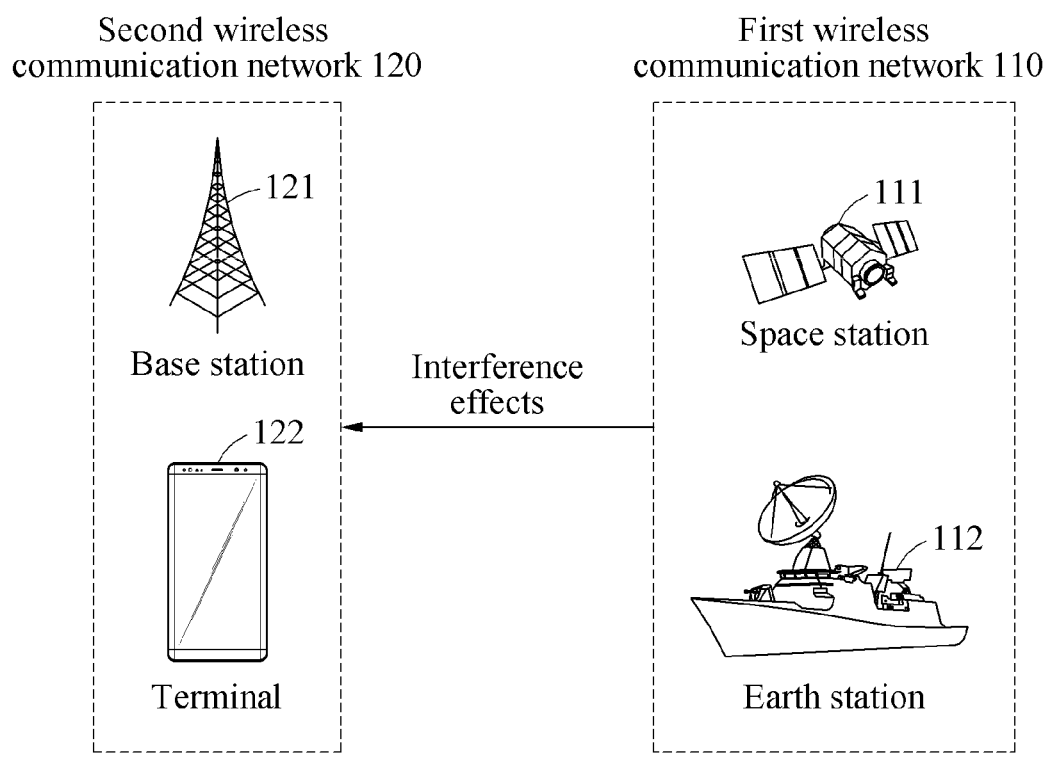
FIG. 1 illustrates interference effects of a communication device of a first wireless communication network to a communication device of a second wireless communication network according to an example embodiment.

Hereinafter, example embodiments will be described in detail with reference to the accompanying drawings. The scope of the right, however, should not be construed as limited to the example embodiments set forth herein. Like reference numerals in the drawings refer to like elements throughout the present disclosure.

Various modifications may be made to the example embodiments. Here, the examples are not construed as limited to the disclosure and should be understood to include all changes, equivalents, and replacements within the idea and the technical scope of the disclosure.

Although terms of "first," "second," and the like are used to explain various components, the components are not limited to such terms. These terms are used only to distinguish one component from another component. For example, a first component may be referred to as a second component, or similarly, the second component may be referred to as the first component within the scope of the present disclosure.

The terminology used herein is for the purpose of describing particular embodiments only and is not intended to be limiting. As used herein, the singular forms are intended to include the plural forms as well, unless the context clearly indicates otherwise. It will be further understood that the terms "comprise" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in dictionaries generally used should be construed to have meanings matching contextual meanings in the related art and are not to be construed as an ideal or excessively formal meaning unless otherwise defined herein.

Regarding the reference numerals assigned to the elements in the drawings, it should be noted that the same elements will be designated by the same reference numerals, wherever possible, even though they are shown in different drawings. Also, in the description of example embodiments, detailed description of well-known related structures or functions will be omitted when it is deemed that such description will cause ambiguous interpretation of the present disclosure.

Hereinafter, the example embodiments will be described described in detail with reference to the accompanying drawings.

FIG. 1 illustrates interference effects of a communication device of a first wireless communication network to a communication device of a second wireless communication network according to an example embodiment.

A communication device of a first wireless communication network 110 may perform wireless communication, for example, satellite communication. Here, the communication device of the first wireless communication network 110 may be, for example, a space station 111 or an earth station 112. In detail, the space station 111 being the communication device of the first wireless communication network 110 may be a geosynchronous satellite, and the earth station 112 being the communication device of the first wireless communication network 110 may be a device which moves on the earth, for example, a vessel. The geosynchronous satellite being the space station 111 and the vessel being the earth station 112 may transmit and receive data through satellite communication.

A communication device of a second wireless communication network 120 may perform wireless communication, for example, mobile communication. Here, the communication device of the second wireless communication network 120 may be, for example, a base station 121 or a terminal 122. In detail, the base station 121 and the terminal 122 each being the communication device of the second wireless communication network 120 may perform data transmission and reception on the ground, and the communication device of the second wireless communication network 120 may be a terrestrial radio station.

The communication device of the first wireless communication network 110 and the communication device of the second wireless communication network 120 may transmit and receive data using the same frequency band or adjacent frequency bands. In this example, when the earth station 112 being the communication device of the first wireless communication network 110 transmits a signal to the space station 111, the communication device of the first wireless communication network 110 may have interference effects to the communication device of the second wireless communication network 120.

Thus, there is a need for a method of mitigating the interference effects to the communication device of the second wireless communication network 120 when the earth station 112 being the communication device of the first wireless communication network 110 transmits a signal to the space station 111. Hereinafter, a method of mitigating interference effects of the communication device of the first wireless communication network 110, for example, the the earth station 112, to the terrestrial radio station being the second wireless communication network 120 will be described.

Figure 2:
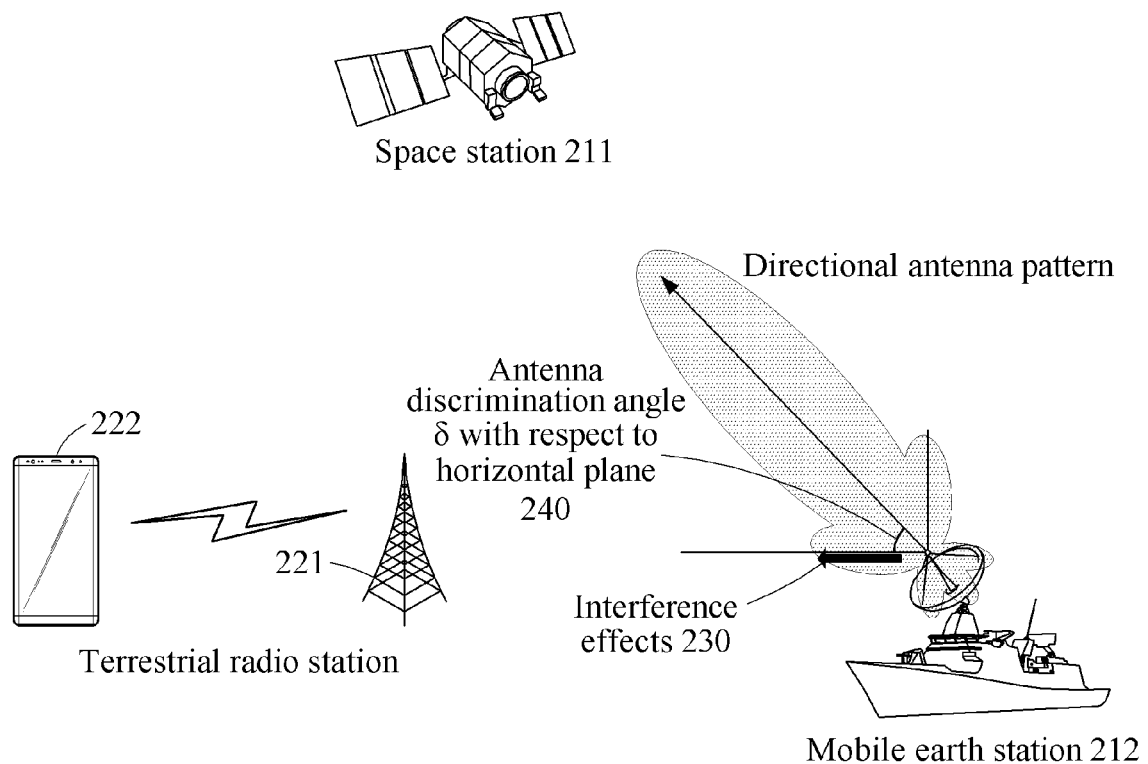
FIG. 2 illustrates an example of a relatively great antenna discrimination angle with respect to a horizontal plane according to an example embodiment.

FIG. 2 illustrates an example of a relatively great antenna discrimination angle with respect to a horizontal plane according to an example embodiment.

Communication devices of a first wireless communication network, for example, a space station 211 and a mobile earth station 212, may transmit and receive signals using a frequency band. Terrestrial radio stations being communication devices of a second wireless communication network, for example, a base station 221 and a terminal 222, may transmit and receive signals using the same frequency band or an adjacent frequency band.

In many cases, the terrestrial radio stations of the second wireless communication network transmit and receive signals in a horizontal direction. Statistically, more than 99% of the terrestrial radio stations transmit and receive signals in the horizontal direction at an angle between 0 degrees and 5 degrees. An angle at which an antenna of the mobile earth station 212 faces the space station 211 may differ depending on positions of the mobile earth station 212 and the space station 211 performing wireless communication, for example, satellite communication. Further, the antenna of the mobile earth station 212 has a directional antenna pattern, and the interference effects to the terrestrial radio stations may differ depending on the angle.

In this example, the mobile earth station 212 is an earth station of which a position changes over time, and the terrestrial radio stations of the second wireless communication network may receive interference effects 230 by the signals transmitted from the mobile earth station 212 to the space station 211.

A radio environment in which the mobile earth station 212 transmits and receives signals to and from the space station 211 continuously changes due to the mobility of the mobile earth station 212, and the interference effects to the terrestrial radio stations may also continuously change accordingly. Thus, an antenna discrimination angle δ 240 of the mobile earth station 212 with respect to a horizontal direction may be determined based on position information of the mobile earth station 212 and the space station 211.

The antenna discrimination angle δ 240 may indicate an angle at which the mobile earth station 212 faces the space station 211 based on the horizontal direction. A method of determining the antenna discrimination angle δ 240 will be described in detail with reference to FIG. 4.

In this example, by varying a transmission power for the signals transmitted from the mobile earth station 212 to the space station 211 based on the antenna discrimination angle δ 240, the interference effects 230 to the terrestrial radio stations may be mitigated.

Figure 3:
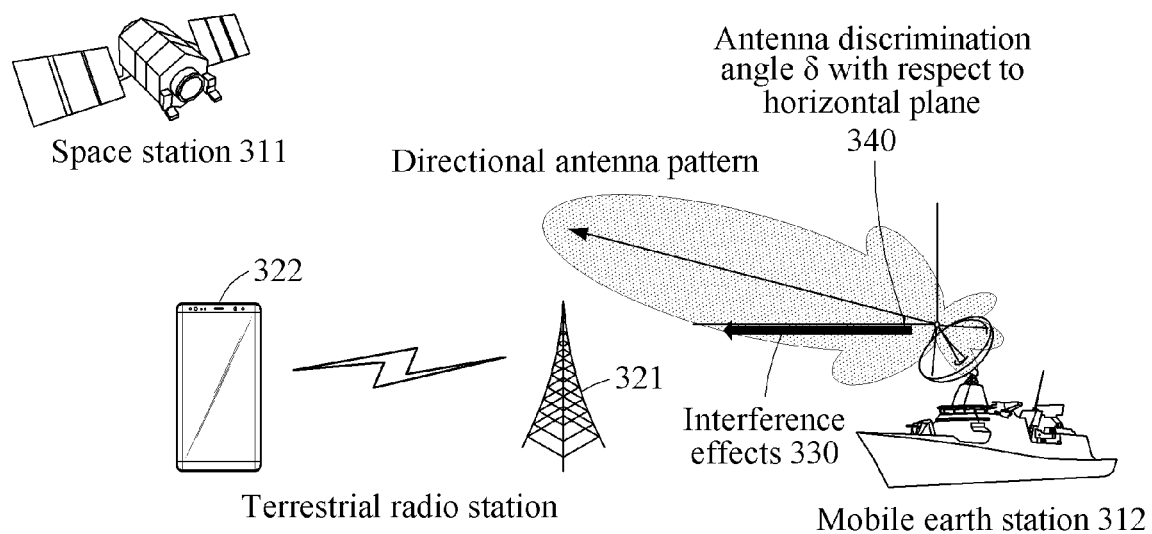
FIG. 3 illustrates an example of a relatively small antenna discrimination angle with respect to a horizontal plane according to an example embodiment.

Unlike FIG. 3, FIG. 2 illustrates an example of a relatively great antenna discrimination angle δ 240. A great antenna discrimination angle may indicate a relatively great vertical component and a relatively small horizontal component of an intensity of signal transmitted from the mobile earth station 212 to the space station 211. Here, the relatively small horizontal component of the intensity of signal transmitted from the mobile earth station 212 to the space station 211 may indicate relatively small interference effects 230 of the mobile earth station 212 to the terrestrial radio stations. Here, the intensity of signal may be determined based on the transmission power.

FIG. 3 illustrates an example of a relatively small antenna discrimination angle with respect to a horizontal plane according to an example embodiment.

Similar to FIG. 2, communication devices of a first wireless communication network, for example, a space station 311 and a mobile earth station 312, may transmit and receive signals using a frequency band. Terrestrial radio stations being communication devices of a second wireless communication network, a base station 321 and a terminal 322, may transmit and receive signals using the same frequency band or an adjacent frequency band.

In this example, the mobile earth station 312 is an earth station of which a position changes over time, and the terrestrial radio stations of the second wireless communication network may receive interference effects 330 by the signals transmitted from the mobile earth station 312 to the space station 311.

A radio environment in which the mobile earth station 312 transmits and receives signals to and from the space station 311 continuously changes due to the mobility of the mobile earth station 312, and the interference effects to the terrestrial radio stations may also continuously change accordingly. Thus, an antenna discrimination angle δ 340 of the mobile earth station 312 with respect to a horizontal direction may be determined based on position information of the mobile earth station 312 and the space station 311.

The antenna discrimination angle δ 340 may indicate an angle at which the mobile earth station 312 faces the space station 311 based on the horizontal direction. A method of determining the antenna discrimination angle δ 340 will be described in detail with reference to FIG. 4.

In this example, by varying a transmission power for the signals transmitted from the mobile earth station 312 to the space station 311 based on the antenna discrimination angle δ 340, the interference effects 330 to the terrestrial radio stations may be mitigated.

Unlike FIG. 2, FIG. 3 illustrates an example of a relatively small antenna discrimination angle δ 340. A small antenna discrimination angle may indicate a relatively small vertical component and a relatively great horizontal component of an intensity of signal transmitted from the mobile earth station 312 to the space station 311. Here, the relatively great horizontal component of the intensity of signal transmitted from the mobile earth station 312 to the space station 311 may indicate relatively great interference effects 330 of the mobile earth station 312 to the terrestrial radio stations.

Thus, when the antenna discrimination angle δ 340 is relatively small, an interference effect mitigating apparatus may mitigate the interference effects 330 to the terrestrial radio stations by reducing the intensity of signal transmitted from the mobile earth station 312 to the space station 311.

Figure 4:
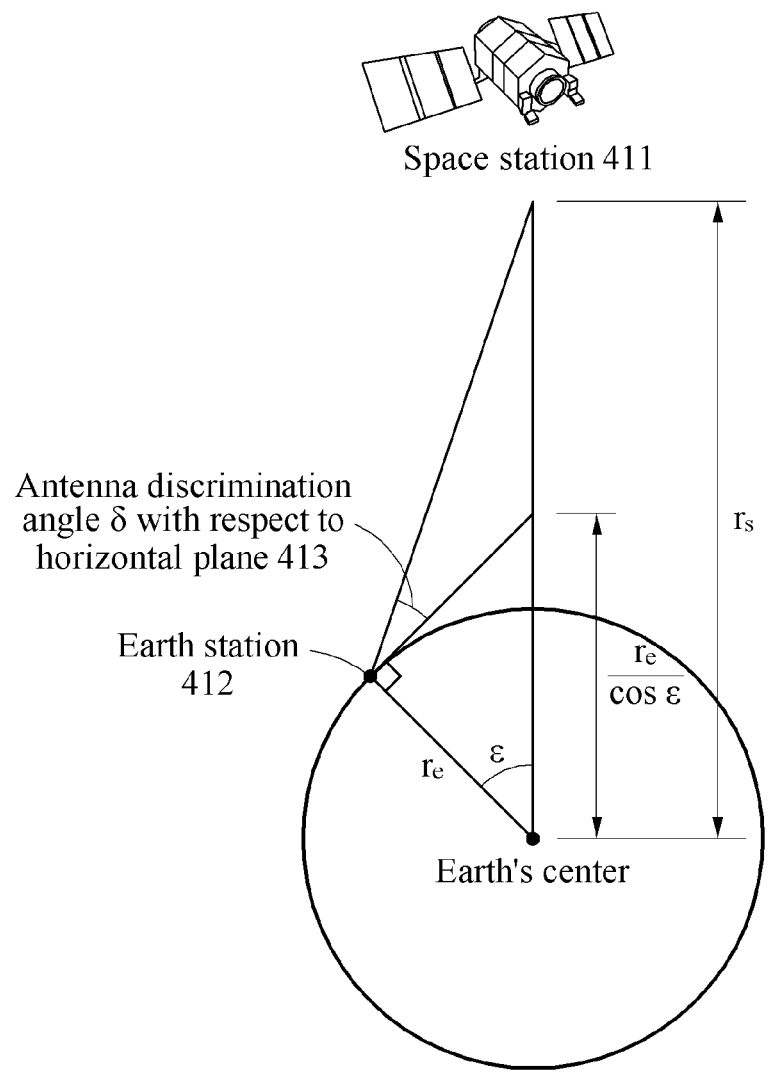
FIG. 4 illustrates an example of determining an antenna discrimination angle of a mobile earth station with respect to a horizontal plane according to an example embodiment.

FIG. 4 illustrates an example of determining an antenna discrimination angle of a mobile earth station with respect to a horizontal plane according to an example embodiment.

A communication device of a first wireless communication network, for example, a space station 411, may be a geosynchronous satellite which is at a latitude of 0 degrees and an altitude of about 36,000 km at all times. Thus, a position of the space station 411 may be determined based on a longitude thereof.

Further, a position of an earth station 412 on the surface of the earth may be determined based on latitude and longitude values thereof. That is, since an antenna of the earth station 412 faces the space station 411 at all times, an antenna discrimination angle of the earth station 412 with respect to a horizontal direction may be determined when the positions of the earth station 412 and the space station 411 are determined.

For example, when positions of a space station and an earth station are determined, a distance $r_s$ from the space station to the center of the earth, a distance $r_e$ from the earth station to the center of the earth, and an earth station-earth center-space station angle ε may be determined. Based on the distance $r_s$, the distance $r_e$, and the angle ε, an antenna discrimination angle δ 413 of an antenna of the earth station with respect to a horizontal direction may be determined.

When the earth station 412 is a mobile earth station of which a position is not fixed, interference effects of the mobile earth station to the terrestrial radio stations may also change.

For example, when the earth station 412 moves to a position at a relatively high latitude and a longitude relatively far from the space station 411 being a geosynchronous satellite, the earth station 412 may have a relatively small antenna discrimination angle with respect to the horizontal direction. A small antenna discrimination angle may indicate that a beam direction of the antenna of the earth station 412 is relatively close to a horizontal plane, and thus interference effects to the systems may increase.

Conversely, when the earth station 412 moves to a position at a relatively low latitude and a longitude relatively close to the space station 411 being a geosynchronous satellite, the earth station 412 may have a relatively great antenna discrimination angle with respect to the horizontal direction. A great antenna discrimination angle may indicate that the beam direction of the antenna of the earth station 412 is relatively far from the horizontal plane, and thus the interference effects to the systems may decrease.

The earth station 412 may determine the antenna discrimination angle 413 with respect to the horizontal direction based on position information of the earth station 412 and the space station 411, irrespective of information related to the terrestrial radio stations using the same frequency band or an adjacent frequency band. Thus, the earth station 412 may transmit signals to the space station 411 using a relatively high transmission power when the determined antenna discrimination angle is relatively great, and transmit signals to the space station 411 using a relatively low transmission power when the determined antenna discrimination angle is relatively small. That is, the earth station 412 may mitigate the interference effects to the terrestrial radio stations by adjusting the transmission power based on the antenna discrimination angle.

FIG. 5 illustrates an interference effect mitigating method performed by an interference effect mitigating apparatus according to an example embodiment.

An interference effect mitigating apparatus may be provided inside or outside of a mobile earth station which performs satellite communication, and mitigate interference effects to a terrestrial radio station based on an antenna discrimination angle with respect to a horizontal direction.

In operation 510, the interference effect mitigating apparatus may collect position information including a position, of a communication device of a first wireless communication network, which changes over time.

In operation 520, the interference effect mitigating apparatus may determine an antenna discrimination angle based on the collected position information.

In this example, interference effects of the mobile earth station being the communication device of the first wireless communication network to the terrestrial radio station being a communication device of a second wireless communication network may decrease when the antenna discrimination angle with respect to a horizontal direction increases. Conversely, the interference effects of the mobile earth station being the communication device of the first wireless communication network to the terrestrial radio station being the communication device of the second wireless communication network may increase when the antenna discrimination angle with respect to the horizontal direction decreases.

In operation 530, the interference effect mitigating apparatus may determine a transmission power and a transmission scheme of the communication device of the first wireless communication network based on the determined antenna discrimination angle, to mitigate the interference effects of the communication device of the first wireless communication network to the communication device of the second wireless communication network.

The mobile earth station being the communication device of the first wireless communication network may determine preset criteria corresponding to the antenna discrimination angle in advance. Here, the preset criteria may be a transmission power and a transmission scheme corresponding to an antenna discrimination angle. The transmission scheme may be determined to compensate for a change in the transmission power based on the antenna discrimination angle. In detail, when the mobile earth station is to transmit signals using a relatively low transmission power, a transmission scheme to be applied may be determined to supplement a relatively low intensity of signal.

For example, when the antenna discrimination angle δ is greater than or equal to 0 degrees and less than α degrees, the mobile earth station may transmit signals to a space station using a transmission power of level 1. In this example, Binary Phase Shift Keying (BPSK) may be used as an example of the transmission scheme to supplement the transmission power of level 1.

When the antenna discrimination angle δ is greater than or equal to α degrees and less than β degrees, the mobile earth station may transmit signals to the space station using a transmission power of level 2. In this example, Quadrature Phase Shift Keying (QPSK) may be used as an example of the transmission scheme to supplement the transmission power of level 2.

When the antenna discrimination angle δ is greater than or equal to β degrees and less than γ degrees, the mobile earth station may transmit signals to the space station using a transmission power of level 3. In this example, Eight Phase Shift Keying (8PSK)) may be used as an example of the transmission scheme to supplement the transmission power of level 3.

When the antenna discrimination angle δ is greater than or equal to γ degrees and less than 90 degrees, the mobile earth station may transmit signals to the space station using a transmission power of level 4. In this example, 16 Quadrature Amplitude Modulation (16QAM) may be used as an example of the transmission scheme to supplement the transmission power of level 4.

In this example, the magnitude of the transmission power may relatively increase in an order of level 1<level 2<level 3<level 4. In addition, α, β, and γ which determine a section of the antenna discrimination angle δ in which the transmission power and the transmission scheme change may be determined in advance based on an interference environment and/or the mobile earth station. Thus, the section of the antenna discrimination angle δ may be different from that in the examples described above depending on an environment. In this example, a transmission power and a transmission scheme to be applied may also be determined properly depending on the environment.

When a movement of the communication device of the first wireless communication network is detected in operation 540, the process from operation 510 to operation 530 may be iteratively performed. That is, each time the position of the mobile earth station changes, an antenna discrimination angle at the corresponding position may be determined, and a transmission power and a transmission scheme may be determined based on the determined antenna discrimination angle. Thus, even when the antenna discrimination angle changes depending on the position of the mobile earth station, interference effects of the mobile earth station to the terrestrial radio station may be mitigated. That is, irrespective of information related to the terrestrial radio station which is a victim receiver receiving the interference effects, the interference effects to the terrestrial radio station may be mitigated based on the antenna discrimination angle of the mobile earth station with respect to the horizontal direction. In another example, when position information of the terrestrial radio station which is a victim receiver receiving the interference effects is known, a terrestrial radio station-mobile earth station-space station antenna discrimination angle may be determined. When the transmission power of the mobile earth station is adjusted based on the determined antenna discrimination angle, the interference effects may be mitigated more precisely.

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The apparatus described herein may be implemented using a hardware component, a software component and/or a combination thereof. A processing device may be implemented using one or more general-purpose or special purpose computers, such as, for example, a processor, a controller and an arithmetic logic unit (ALU), a DSP, a microcomputer, an FPGA, a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of mitigating interference effects, the method comprising:
   collecting position information including a position, of a communication device of a first wireless communication network, which changes over time;
   determining an antenna discrimination angle based on the collected position information; and
   determining a transmission power and a transmission scheme of the communication device of the first wireless communication network based on the determined antenna discrimination angle, to mitigate interference effects of the communication device of the first wireless communication network to a communication device of a second wireless communication network.

2. The method of claim 1, wherein the interference effects of the communication device of the first wireless communication network to the communication device of the second wireless communication network decrease when the antenna discrimination angle increases, or
   the interference effects of the communication device of the first wireless communication network to the communication device of the second wireless communication network increase when the antenna discrimination angle decreases.

3. The method of claim 1, wherein the communication device of the first wireless communication network is a mobile earth station which communicates with a geosynchronous satellite, and the communication device of the second wireless communication network is a terrestrial radio station which performs wireless communication.

4. The method of claim 3, wherein the antenna discrimination angle is determined based on a position of the geosynchronous satellite and a position of the mobile earth station.

5. The method of claim 1, wherein i) when the antenna discrimination angle is greater than or equal to 0 degrees and less than $\alpha$ degrees, the transmission power is level 1, and the transmission scheme is Binary Phase Shift Keying (BPSK), or ii) when the antenna discrimination angle is greater than or equal to $\alpha$ degrees and less than $\beta$ degrees, the transmission power is level 2, and the transmission scheme is Quadrature Phase Shift Keying (QPSK), or iii) when the antenna discrimination angle is greater than or equal to $\beta$ degrees and less than $\gamma$ degrees, the transmission power is level 3, and the transmission scheme is Eight Phase Shift Keying (8PSK), or iv) when the antenna discrimination angle is greater than or equal to $\gamma$ degrees and less than 90 degrees, the transmission power is level 4, and the transmission scheme is 16 Quadrature Amplitude Modulation (16QAM).

6. The method of claim 1, wherein the transmission power of the communication device of the first wireless communication network increases when the antenna discrimination angle increases, or
   the transmission power of the communication device of the first wireless communication network decreases when the antenna discrimination angle decreases.

7. The method of claim 1, wherein the transmission scheme is determined to compensate for a change in the transmission power of the communication device of the first wireless communication network.

8. The method of claim 1, wherein the communication device of the first wireless communication network and the communication device of the second wireless communication network use the same frequency band or adjacent frequency bands.

9. The method of claim 1, wherein the determining of the transmission power of the communication device of the first wireless communication network comprises updating the transmission power of the communication device of the first wireless communication network over time, based on the antenna discrimination angle corresponding to the position, of the communication device of the first wireless communication network, which changes over time.

10. A non-transitory computer-readable storage medium storing instructions that, when executed by a processor, cause the processor to perform the method of claim 1.

11. An apparatus for mitigating interference effects, the apparatus comprising:
a processor and a memory including computer-readable instructions,
wherein, when the instructions are executed by the processor, the processor is configured to collect position information including a position, of a communication device of a first wireless communication network, which changes over time, determine an antenna discrimination angle based on the collected position information, and determine a transmission power and a transmission scheme of the communication device of the first wireless communication network based on the determined antenna discrimination angle, to mitigate interference effects of the communication device of the first wireless communication network to a communication device of a second wireless communication network.

12. The apparatus of claim 11, wherein the interference effects of the communication device of the first wireless communication network to the communication device of the second wireless communication network decrease when the antenna discrimination angle increases, or
the interference effects of the communication device of the first wireless communication network to the communication device of the second wireless communication network increase when the antenna discrimination angle decreases.

13. The apparatus of claim 11, wherein the communication device of the first wireless communication network is a mobile earth station which communicates with a geosynchronous satellite, and the communication device of the second wireless communication network is a terrestrial radio station which performs wireless communication.

14. The apparatus of claim 13, wherein the antenna discrimination angle is determined based on a position of the geosynchronous satellite and a position of the mobile earth station.

15. The apparatus of claim 11, wherein i) when the antenna discrimination angle is greater than or equal to 0 degrees and less than $\alpha$ degrees, the transmission power is level 1, and the transmission scheme is Binary Phase Shift Keying (BPSK), or ii) when the antenna discrimination angle is greater than or equal to $\alpha$ degrees and less than $\beta$ degrees, the transmission power is level 2, and the transmission scheme is Quadrature Phase Shift Keying (QPSK), or iii) when the antenna discrimination angle is greater than or equal to $\beta$ degrees and less than $\gamma$ degrees, the transmission power is level 3, and the transmission scheme is Eight Phase Shift Keying (8PSK), or iv) when the antenna discrimination angle is greater than or equal to $\gamma$ degrees and less than 90 degrees, the transmission power is level 4, and the transmission scheme is 16 Quadrature Amplitude Modulation (16QAM).

16. The apparatus of claim 11, wherein the transmission power of the communication device of the first wireless communication network increases when the antenna discrimination angle increases, or
the transmission power of the communication device of the first wireless communication network decreases when the antenna discrimination angle decreases.

17. The apparatus of claim 11, wherein the processor is configured to determine the transmission scheme to compensate for a change in the transmission power of the communication device of the first wireless communication network.

18. The apparatus of claim 11, wherein the communication device of the first wireless communication network and the communication device of the second wireless communication network use the same frequency band or adjacent frequency bands.

19. The apparatus of claim 11, wherein the processor is configured to update the transmission power of the communication device of the first wireless communication network over time, based on the antenna discrimination angle corresponding to the position, of the communication device of the first wireless communication network, which changes over time, when determining the transmission power of the communication device of the first wireless communication network.

* * * * *